United States Patent [19]

Mogi et al.

[11] 3,893,074

[45] July 1, 1975

[54] REMOTE CONTROL SYSTEM UTILIZING SIGNAL FREQUENCY SEQUENCE

[75] Inventors: Takao Mogi, Tokyo; Hisao Okada, Yokohama, both of Japan

[73] Assignee: Sony Corporation, Tokyo, Japan

[22] Filed: Oct. 5, 1973

[21] Appl. No.: 404,374

[30] Foreign Application Priority Data

Oct. 12, 1972 Japan .............................. 47-102096

[52] U.S. Cl. ............................ 340/171 PF; 340/148

[51] Int. Cl. ............................ H04b 1/16; H04q 9/12

[58] Field of Search ...... 340/171 R, 171 PF, 171 A, 340/148; 325/30, 37, 64, 392

[56] References Cited

UNITED STATES PATENTS 3,737,857 6/1973 Carman .............................. 340/148

*Primary Examiner*—Donald J. Yusko

*Attorney, Agent, or Firm*—Lewis H. Eslinger; Alvin Sinderbrand

[57] ABSTRACT

A remote control system comprising, a remote transmitter for producing a remote control signal having different frequency components arranged in a predetermined order, and a receiver producing a plurality of control signals in response to the order of frequency components of the remote control signal.

8 Claims, 39 Drawing Figures

REMOTE CONTROL SYSTEM UTILIZING SIGNAL FREQUENCY SEQUENCE

BACKGROUND OF THE INVENTION

1. Field of the Invention

This invention relates generally to a remote control system, and more particularly to a remote control system avoiding a misoperation of the controlled circuit caused from a noise.

2. Description of the Prior Art

In prior remote control systems, a plurality of supersonic signals each having a different frequency are used to control a plurality of circuits, such as a power control circuit and a channel selecting circuit of a television receiver. Each frequency corresponds to one control circuit, but the control circuit may misoperate as a result of an acoustic nouse such as the ringing of a telephone bell or the creaking of a door, because such sounds contain not only an audible signal component but also a supersonic signal component.

SUMMARY OF THE INVENTION

A remote control system utilizes a supersonic signal comprising two different frequency components arranged in a predetermined order, the order of the two frequencies being changed according to the circuit to be controlled. The remote control signal receiver has two frequency selecting means, two memory means and memory reset means; and the receiver produces a plurality of control signals in response to the order of two frequency components of the supersonic remote control signal.

It is an object of this invention to provide a remote control system avoiding a misoperation of the control circuit due to an acoustic noise.

Another object of this invention is to provide an improved remote control system which produces a control signal only when a received signal continues for a predetermined time period.

Further, still another object of this invention is to provide an improved remote control system which produces a control signal only when a received signal comprises two different frequency components arranged in a predetermined order.

Still a further object of this invention is to provide an improved remote control system avoiding misoperation of the control circuit due to momentary interruption of the supersonic remote control signal.

DESCRIPTION OF THE PREFERRED EMBODIMENT

Figure 1:
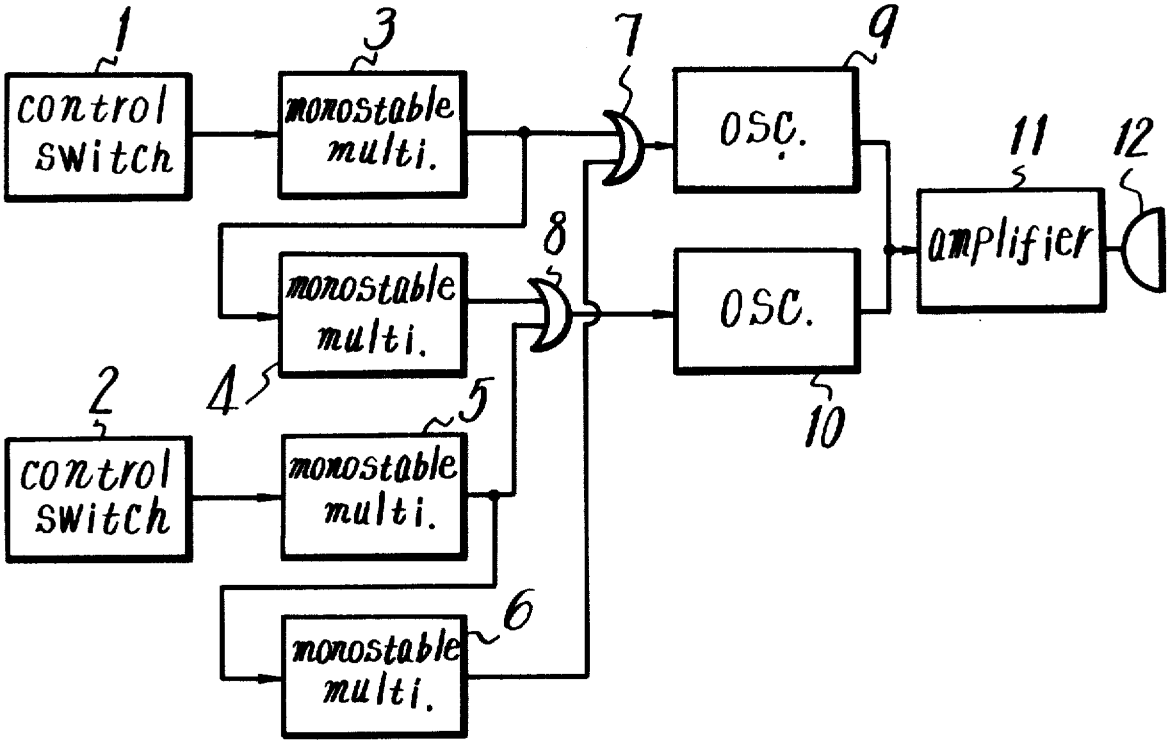
FIG. 1 shows a block diagram of a remote control transmitter used in this invention.

FIG. 1 shows an example of a remote control transmitter used in the present invention. In the example of FIG. 1, control switches 1 and 2 may be push buttons, either of which would be pushed down in accordance with the circuit to be controlled. By way of example, when the control switch 1 is actuated, the power switch of a television receiver is controlled, while when the control switch 2 is actuated, the channel selector of the television receiver is controlled.

The control switch 1 is connected to a monostable multibrator 3, the output of which is supplied through an OR-circuit 7 to an oscillator 9 oscillating at a frequency $f_1$, and is also supplied to a monostable multivibrator 4. The output from the monostable multivibrator 4 is applied through an OR-circuit 8 to an oscillator 10 which oscillates at a frequency $f_2$. The output through the control switch 2 is connected to a monostable multivibrator 5. The output from the monostable multivibrator 5 is fed through the OR-circuit 8 to the oscillator 10 and to a monostable multivibrator 6, the output from which is fed through the OR-circuit 7 to the oscillator 9. The outputs from the oscillators 9 and 10 are amplified by an amplifier 11 and are fed to a speaker 12 which then produces a supersonic signal.

Figures 2A, 2B, 2C, 2D, 2E, 2F:
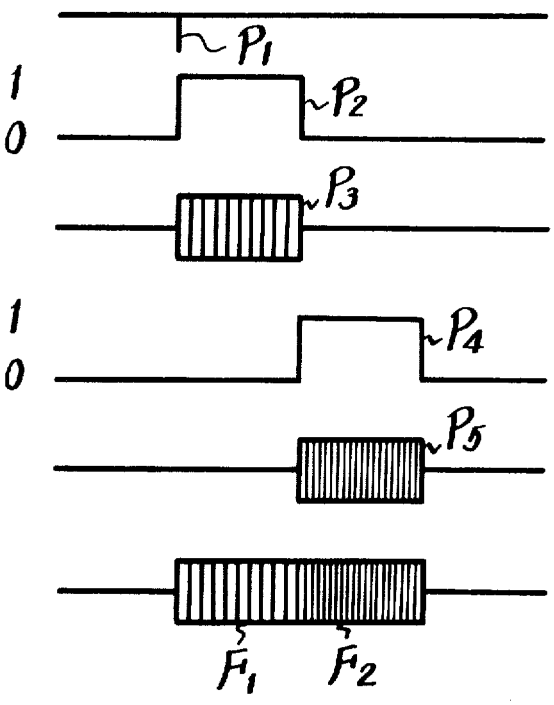
FIG. 2A to FIG. 2F, inclusive, show waveforms produced at various parts of the remote control transmitter shown in FIG. 1.

When the control switch 1 is actuated, a trigger pulse $P_1$ shown in FIG. 2A is produced from the control switch 1. The monostable multivibrator 3 is triggered by the trigger pulse $P_1$ and produces a positive pulse $P_2$ shown in FIG. 2B. The oscillator 9 is actuated by the pulse $P_2$ and produces a signal $P_3$ shown in FIG. 2C, the frequency of which is $f_1$ as mentioned above. The monostable multivibrator 4 is triggered by the trailing edges of the pulse $P_2$ to produce a pulse $P_4$ shown in FIG. 2E. The oscillator 10 is actuated by the pulse $P_4$ and produces a signal $P_5$ with a frequency of $f_2$ as shown in FIG. 2D. The signals $P_3$ and $P_5$ are amplified by the common amplifier 11, so that a supersonic wave signal $F_1$ with the frequency of $f_1$ and a supersonic wave signal $F_2$ with the frequency of $f_2$ are sequentially obtained from the speaker 12 as shown in FIG. 2F.

Alternatively, if the control switch 2 is actuated, the monostable multivibrators 5 and 6 achieve the same operation as in the case when the control switch 1 is operated except that the supersonic signal $F_2$ with the frequency of $f_2$ is produced first and is followed by the supersonic signal $F_1$ with the frequency of $f_1$.

As is apparent from the above description, when either of the control switches 1 or 2 is actuated, there is obtained from the speaker 12*a* supersonic signal comprising two different frequency components arranged in a predetermined order.

A remote control receiver according to the invention will be now described with reference to FIG. 3.

Figure 3:
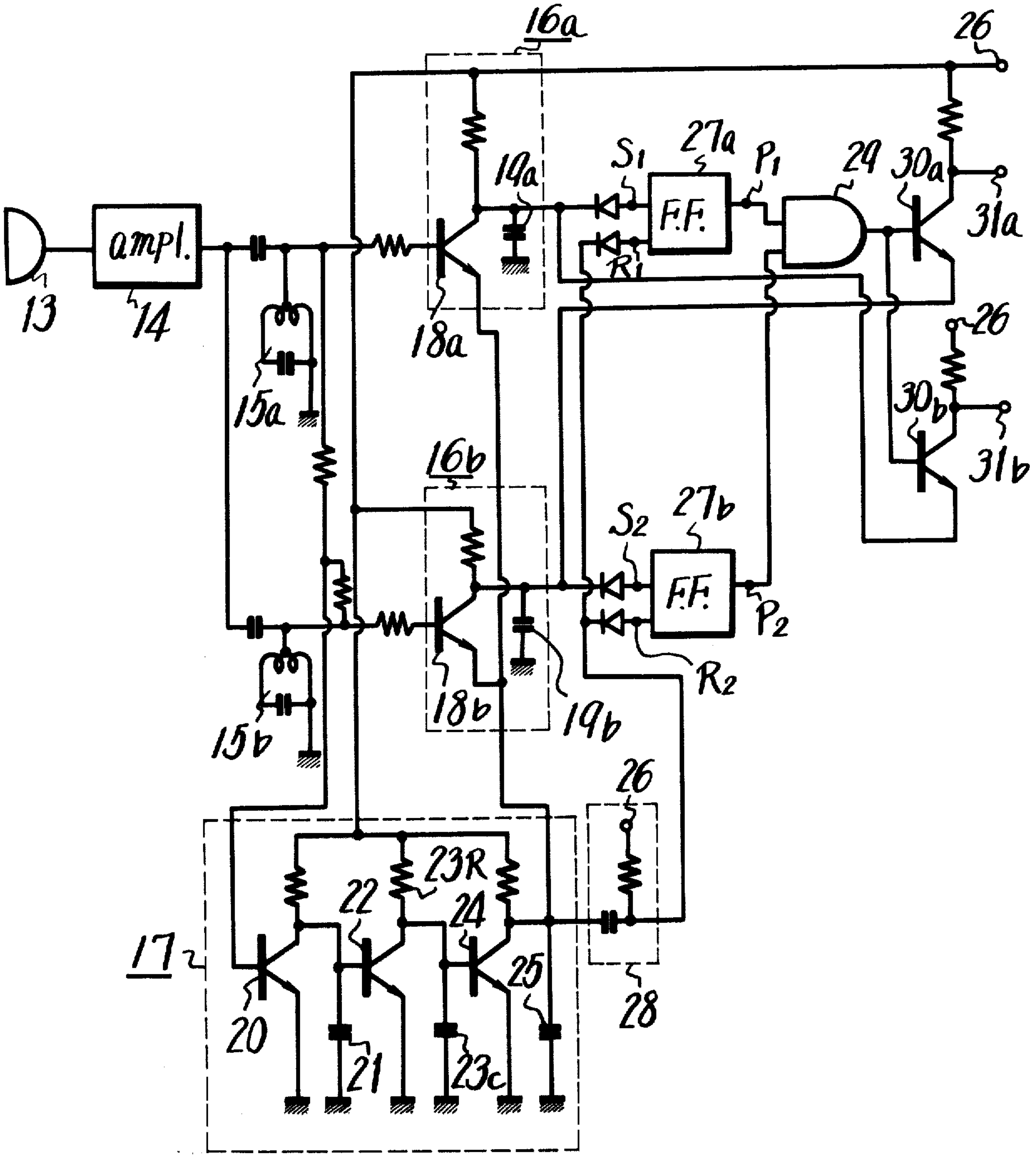
FIG. 3 shows a schematic diagram of a remote control receiver used in this invention.

In FIG. 3, reference numeral 13 designates a microphone which may receive the supersonic signal emitted from the speaker 12 (which is not shown in FIG. 3). The corresponding electric signal from the microphone 13 is amplified by an amplifier 14. The output from the amplifier 14 is fed to a band pass filter 15*a* which may pass therethrough the frequency component $f_1$ and to a band pass filter 15*b* which may pass therethrough the frequency component $f_2$. The output signals from the band pass filters 15*a* and 15*b* are fed to the base electrodes of transistors 18*a* and 18*b* which, together with capacitors 19*a* and 19*b* connected between the ground and their collector electrodes, form detecting circuits 16*a* and 16*b*. The signals from the filters 15*a* and 15*b* are also connected to the base electrode of a transistor 20 in a noise eliminating circuit 17 that includes other elements such as capacitors, resistors, transistors and so on which will be described later.

The emitter electrode of the transistor 20 is grounded. A capacitor 21 is connected between the collector electrode of the transistor 20 and ground. The collector electrode of the transistor 20 is connected to the base electrode of a transistor 22 which has a grounded emitter electrode. The collector electrode of the transistor 22 is grounded through a capacitor 23C that has a relatively large capacity and is connected to a power source terminal 26 through a resistor 23R. The collector electrode of the transistor 22 is further connected to the base electrode of a transistor 24 which has a grounded emitter electrode. A capacitor 25 is connected between the collector electrode of the transistor 24 and the ground. Either of signals with frequencies $f_1$ and $f_2$ is detected by the transistor 20 and the capacitor 21. The transistor 24 is made conductive by a signal that continues for a time period longer than a predetermined time period which is determined by the resistor 23R and the capacitor 23C.

The emitter electrodes of the transistors 18*a* and 18*b* forming the detecting circuits 16*a* and 16*b* are both connected to the collector electrode of the transistor 24 of the noise eliminating circuit 17. The output signal from the detecting circuit 16*a* is applied through a diode to a set terminal $S_1$ of a memory circuit, for example, a flip-flop circuit 27*a*, while the output signal from detecting circuit 16b is applied through a diode to a set terminal $S_2$ of a flip-flop circuit 27*b*. Reset terminals $R_1$ and $R_2$ of the flip-flop circuits 27*a* and 27*b* are supplied with a negative, differentiated pulse produced by differentiating the output from the noise eliminating circuit 17 by a differentiating circuit 28.

The flip-flop circuit 27*a* memorizes the fact that the supersonic wave signal $F_1$ with the frequency $f_1$ is received and is connected at its output terminal $P_1$ to one of the input terminals of an AND-circuit 29, while the flip-flop circuit 27*b* memorizes the fact that the supersonic wave signal $F_2$ with the frequency $f_2$ is received and is connected at its output terminal $P_2$ to the other input terminal of the AND circuit 29. The output signal from the AND circuit 29 is applied to the base electrodes of NPN-type transistors 30*a* and 30*b*, respectively. The emitter electrode of the transistor 30*a* is connected to the output terminal of the detecting circuit 16*b* at the collector electrode of the transistor 18*b*. Only when the output of the AND circuit 29 is 1 and the output of the detecting circuit 16*b* is 0 is the transistor 30*a* is made conductive to provide a 0 at a control signal output terminal 31 *a*, which is connected to the collector electrode of the transistor 30*a*. The emitter electrode of the transistor 30*b* is connected to the output terminal of the detecting circuit 16*a* at the collector electrode of the transistor 18*a*. A control signal output terminal 31*b* is connected to the collector electrode of the transistor 30*b*.

A description will be now given of the operation of the receiver shown in FIG. 3.

Firstly, the case in which the supersonic signal $F_1$ with the frequency $f_1$ and then the supersonic signal $F_2$ with the frequency $f_2$ are transmitted in that order from the transmitter will be now described with reference to FIG. 4A. In such a case, the transistor 24 of the noise eliminating circuit 17 becomes conductive after a noise eliminating time period T*n* (refer to FIG. 4B) which is determined by the resistor 23R and the capacitor 23C has lapsed from the time the supersonic signals shown in FIG. 4A begin to be received, so that the transistor 24 produces at its collector electrode a signal of 0 level as shown in FIG. 4B. The signal is differentiated by the differentiating circuit 28 to be a reset pulse shown in FIG. 4C which is fed to the flip-flop circuits 27*a* and 27*b* at their reset terminals $R_1$ and $R_2$, respectively. The frequency of the supersonic signal $F_1$ which is received firstly is $f_1$, so that only the band pass filter 15*a* delivers an output signal which is fed to the base electrode of the transistor 18*a* of the detecting circuit 16*a*. At this time, since the transistor 24 is made conductive, as mentioned above, the detecting circuit 16*a* is capable of being operated. Accordingly, the detecting circuit 16*a* produces a signal of 0 level shown in FIG. 4D. During this interval, the detecting circuit 16*b* is supplied with no signal, its output signal remains at the 1 level.

Figures 4A, 4B, 4C, 4D, 4E, 4F, 4G, 4H, 4I, 4J:
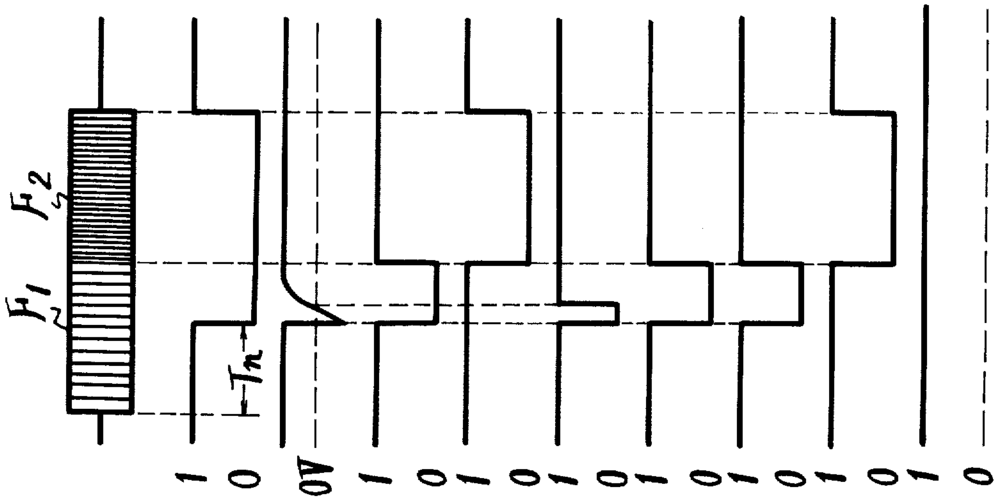

The flip-flop circuits 27*a* and 27*b* are reset by the reset pulse shown in FIG. 4C, but the flip-flop circuit 27*a* has been continuously supplied, at its set terminal $S_1$, with the output signal of 0 level shown in FIG. 4D from the detecting circuit 16*a*. As a result, the flip-flop circuit 27*a* is set immediately after the reset pulse has disappeared and hence it produces at its output terminal $P_1$ an output signal of 1 level shown in FIG. 4F. Meantime, the flip-flop circuit 27*b* is maintained in the reset state since the output signal from the detecting circuit 16*b* is kept at the 1 level. Accordingly, at the output terminal $P_2$ of the flip-flop circuit 27*b* there is obtained an output signal of 0 level shown in FIG. 4G. Therefore, the output from the AND circuit 29 drops to the 0 level as shown in FIG. 4H and the signals at the output terminals 31*a* and 31*b* remain at the 1 level, as shown in FIGS. 4I and 4J.

When the supersonic signal $F_2$ with the frequency $f_2$ is received, only the band pass filter 15*b* delivers an output signal, which is supplied to the base electrode of the transistor 18*b* of the detecting circuit 16*b*. At this time, since the transistor 24 remains conductive and the detecting circuit 16*b* can conduct. Accordingly, the detecting circuit 16*b* produces a signal of 0 level shown in FIG. 4E, and the flip-flop circuit 27*b* is set to produce at its output terminal $P_2$ an output signal of 1 level shown in FIG. 4G. At this time, the output signal at the output terminal $P_1$ of the flip-flop circuit 27*a* is also 1 in level, so that the level of the output signal from the AND circuit 29 as shown in FIG. 4H becomes 1. Accordingly, a positive bias is applied to the base electrodes of the transistors 30*a* and 30*b*, respectively. At this time, however, the transistor 18*b* is conductive but the transistor 18*a* is conductive, so that only the transistor 30*a* is made on and hence the level of an output signal delivered to the output terminal 31*a* becomes 0 as shown in FIG. 4I. However, the level of an output signal delivered to the output terminal 31*b* remains 1 as shown in FIG. 4J.

When the emission of the supersonic signal $F_2$ with the frequency of $f_2$ is stopped, the transistor 18*b* becomes non-conductive with the result that the transistor 30*a* is also made non-conductive and the level of the output signal delivered to the output terminal 31*a* becomes 1 as shown in FIG. 4I.

Figures 5A, 5B, 5C, 5D, 5E, 5F, 5G, 5H, 5I, 5J:
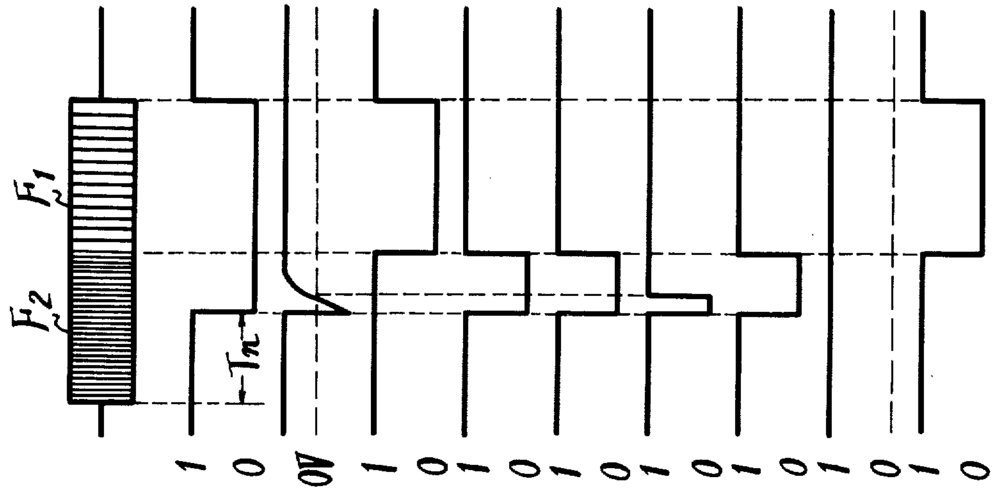
FIG. 4A to FIG. 4J and FIG. 5A to FIG. 5J show waveforms produced at various parts of the remote control receiver shown in FIG. 3.

Next, a description will be given of the case in which the supersonic signal $F_2$ with the frequency $f_2$ and then the supersonic signal $F_1$ with the frequency $f_1$ which are shown in FIG. 5A are transmitted in that order from the transmitter. In such a case, the transistor 24 of the noise eliminating circuit 17 is made conductive after the noise eliminating time period $Tn$ has lapsed from the time when the supersonic signal begins to be received as in the case that the supersonic signal shown in FIG. 4A is received, so that a signal of 0 level shown in FIG. 5B is produced at the collector electrode of the transistor 24. This signal is differentiated by the differentiating circuit 28 to be a reset pulse shown in FIG. 5C which is fed to the reset terminals $R_1$ and $R_2$ of the flip-flop circuits 27*a* and 27*b*. Since the frequency of the supersonic signal received firstly is $f_2$, only the band pass filter 15*b* delivers an output signal, which is applied to the base electrode of the transistor 18*b* of the detecting circuit 16*b*. At this time, since the transistor 24 is conductive as mentioned above, the detecting circuit is operable. Accordingly, the detecting circuit 16*b* produces the signal of 0 level shown in FIG. 4E. At this time, the detecting circuit 16*a* is supplied with no signal, so that its output signal is kept at the "1" level as shown in FIG. 5D. The flip-flop circuits 27*a* and 27*b* are reset with the reset pulse shown in FIG. 5C, but since the set terminal $S_2$ of the flip-flop circuit 27*b* is continuously supplied, with the output signal of 0 level from the detecting circuit 16*b* as shown in FIG. 5E, it is set immediately after the reset pulse has disappeared, thereby to produce at its output terminal $P_2$ an output signal of 1 level shown in FIG. 5G. Meanwhile, since the flip-flop circuit 27*a* is kept in its reset state due to the fact the output from the detecting circuit 16*a* remains at the 1 level, an output signal of 0 level shown in FIG. 5F is delivered to the output terminal $P_1$ of the flip-flop circuit 27*a*. Accordingly, the level of the output signal from the AND circuit 29 becomes O, as shown in FIG. 5H, and the output signals at the output terminals 31*a* and 31*b* remain 1. Thereafter, when the supersonic signal $F_1$ with the frequency $f_1$ is received, only the band pass filter 15*a* delivers an output signal which is applied to the base electrode of the transistor 18*a*. At this time, since the transistor 24 is still conductive, the detecting circuit 16*a* is operable. Accordingly, the detecting circuit 16*a* produces an output signal of 0 level shown in FIG. 5D. Thus, the flip-flop circuit 27*a* is set to produce at its output terminal $P_1$ an output signal of 1 level shown in FIG. 5F. At this time, the level of the output signal at the output terminal $P_2$ is also 1, so that the level of the output from the AND circuit 29 becomes 1, as shown in FIG. 5H. As a result, the positive bias is applied to the base electrodes of the transistors 30*a* and 30*b*, respectively. At this time, the transistor 18*a* is conductive, but the transistor 18*b* is not, so that only the transistor 30*b* is made conductive. For this reason, as shown in FIG. 5J, the output signal at the output terminal 31*b* is at the 0 level, but the output signal at the output terminal 30*a* remains at the 1 in level as shown in FIG. 5I.

When the emission of the supersonic signal $F_1$ with the frequency $f_1$ is stopped, the transistor 18*a* becomes non-conductive, and hence the transistor 30*b* also becomes non-conductive. As a result, the level of the output signal at the output terminal 31b becomes 1.

As may be apparent from the above description, with this invention if two supersonic signals are transmitted in the order $F_1$ and $F_2$ with frequencies $f_1$ and $f_2$, the level of the output signal at the output terminal 31*a* becomes 0 within the predetermined time period, while if the supersonic signals are transmitted in the order $F_2$ and $F_1$, the level of the output signal at the output terminal 31*b* becomes 0 within the predetermined time period. On the other hand, if no supersonic signal is received, the output terminals 31*a* and 31*b* both remain at the 1 level. In a embodiment of FIG. 3, it is defined that the control signal is produced when the output signal at either the output terminal 31*a* or the output terminal 31*b* drops to the 0 level.

In general, since a noise appears during a relatively short time period, in the embodiment of FIG. 3 the noise eliminating circuit 17 is provided to operate the system only in response to a signal which continues for a time period longer than a predetermined time period. This avoids any misoperation which may be caused by the noise.

Further, with this invention the system is operated only when supersonic wave signals with different frequencies are received in a predetermined order, so that there is almost no possibility that misoperation can occur. The reason is that no natural noises with such a characteristic mentioned as above exist.

Figure 6:
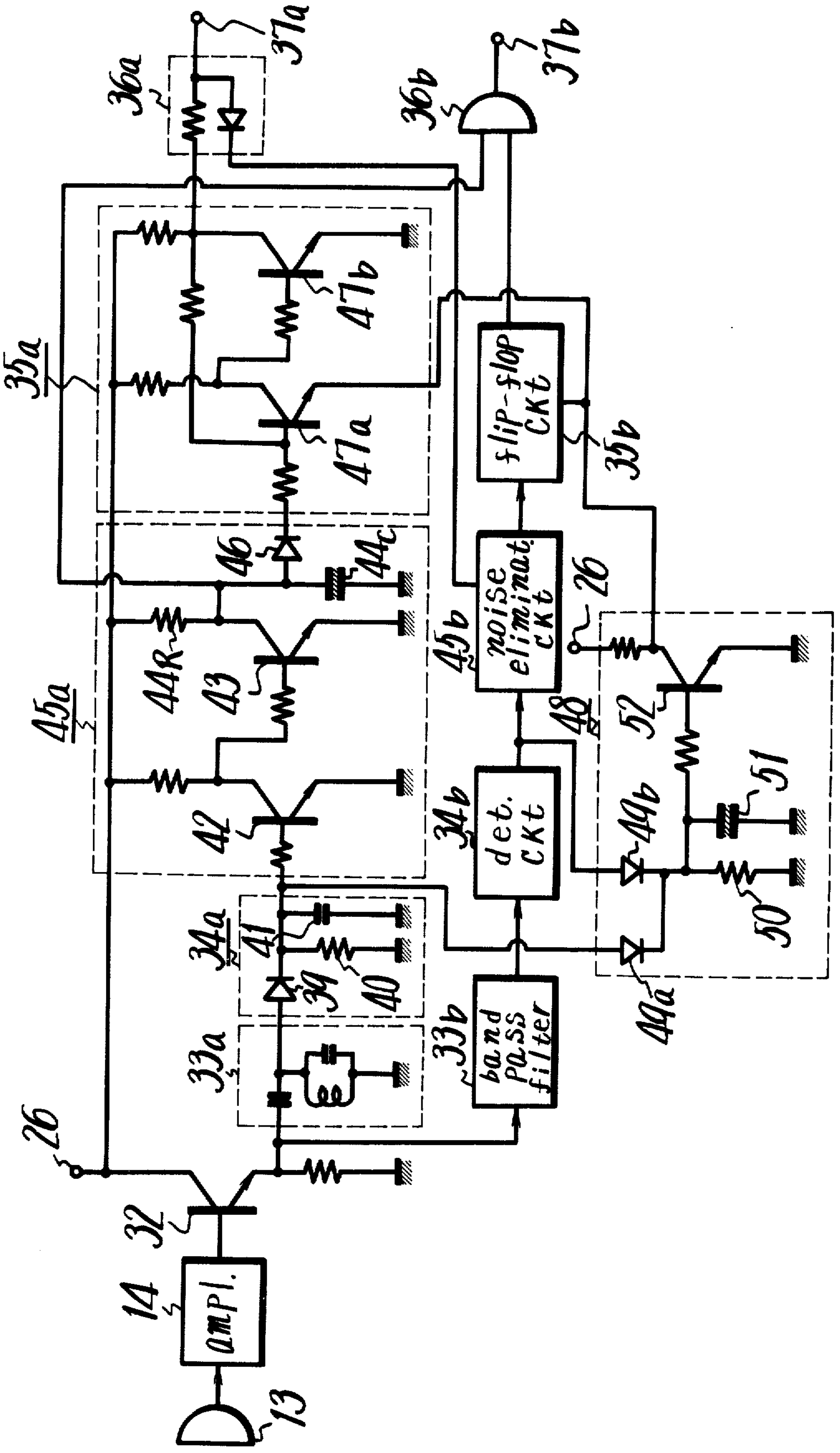
FIG. 6 shows a schematic circuit diagram of another embodiment of the remote control receiver of this invention.

FIG. 6 shows another embodiment of a remote control receiver according to this invention. In the embodiment of FIG. 6, a remote control signal, which is obtained from the microphone 13 by converting a supersonic signal to the corresponding electric signal, is applied through the amplifier 14 and an emitter-follower transistor 32 to a band pass filter 33a that passes a signal component with the frequency $f_1$ and to a band pass filter 33*b* that passes a signal component with the signal $f_2$, respectively. A detecting circuit 34*a* which consists of a diode 39, a resistor 40 and a capacitor 41 receives the output of the band pass filter 33*a* to produce a positive detected output signal which is then applied to a noise eliminating circuit 45*a* consisting of transistors 42, 43, a resistor 44R and a capacitor 44C that has a relatively large capacity. The noise elimination by the noise eliminating circuit 45*a* is as follows. When the output of the detecting circuit 34*a* is fed to the base electrode of the transistor 43, the transistor 43, which is normally conductive becomes non-conductive and the potential at the connection point between the collector electrode of the transistor 43 and the capacitor 44C increases gradually. In this case, the time constant of the resistor 44R and the capacitor 44C is large enough so that, if the received signal is an intermittent one, such as a noise signal, the potential at the connection point between the collector electrode of the transistor 43 and the capacitor 44C will not increase to such a level to make a following transistor 47*a*. Thus, the noise component is eliminated. The connection point between the collector electrode of the transistor 43 and the capacitor 44C in the noise eliminating circuit 45*a* is connected through a diode 46 with a polarity shown in the figure to the base electrode of a transistor 47*a* which forms a flip-flop circuir 35*b* together with a transistor 47*b*.

The supersonic signal with the frequency $f_2$ similarly passes through the band pass filter 33*b* and then is detected by a detecting circuit 34*b*. The output signal from the detecting circuit 34*b* is fed to a noise eliminating circuit 45*b* the output of which is memorized in a flip-flop circuit 35*b*. The band pass filter 33*b*, detecting circuits 34*b*, noise eliminating circuit 45*b* and flip-flop circuit 35*b* are constructed to be substantially similar to the circuits 33*a*, 34*a*, 45*a* and 35*a*, respectively, so that their construction is not described and shown for the sake of brevity.

The output of the flip-flop circuit 35*a* and the output of the noise eliminating circuit 45*b* are applied to an AND circuit 36*a* the output terminal of which is connected to a control signal output terminal 37*a*, while the outputs of the flip-flop circuit 35*b* and the noise eliminating circuit 45*a* are applied to an AND circuit 36*b* the output terminal of which is connected to a control signal output terminal 37*b*. The time constant (discharging time constant) of the detecting circuits 34*a* and 34*b* is selected to be relatively short so as to eliminate noise components by the following noise eliminating circuits 45*a* and 45*b*, respectively.

A reset circuit 48 that consists of a resistor 50, a capacitor 51 of relatively large capacity a transistor 52 and acts to reset both the flip-flop circuits 35*a* and 35*b* simultaneously. The output terminals of the detecting circuits 34*a* and 34*b* are connected together to the reset circuit 48 through diodes 49*a* and 49*b* with the polarities shown in the figure. The connection point between the diodes 49*a* and 49*b* is grounded through the parallel connection of the resistor 50 and capacitor 51 and connected to the base electrode of the transistor 52 through a resistor. The collector electrode of the transistor 52 is connected to the power supply terminal 26 and its emitter electrode is grounded. The collector electrode of the transistor 52 in the reset circuit 48 is connected forming to the emitter electrode of the transistor 47*a* forming and similarly to the corresponding transistor (not shown) of the flip-flop circuit 35*b*. In this case, the discharging time constant of the reset circuit 48 determined by the resistor 50 and capacitor 51 is long enough as compared with that of the detecting circuits 34*a* and 34*b*.

A description will be now given on the operation of the embodiment shown in FIG. 6 with reference to FIG. 7A to FIG. 7J.

Figures 7A, 7B, 7C, 7D, 7E, 7F, 7G, 7H, 7I, 7J:
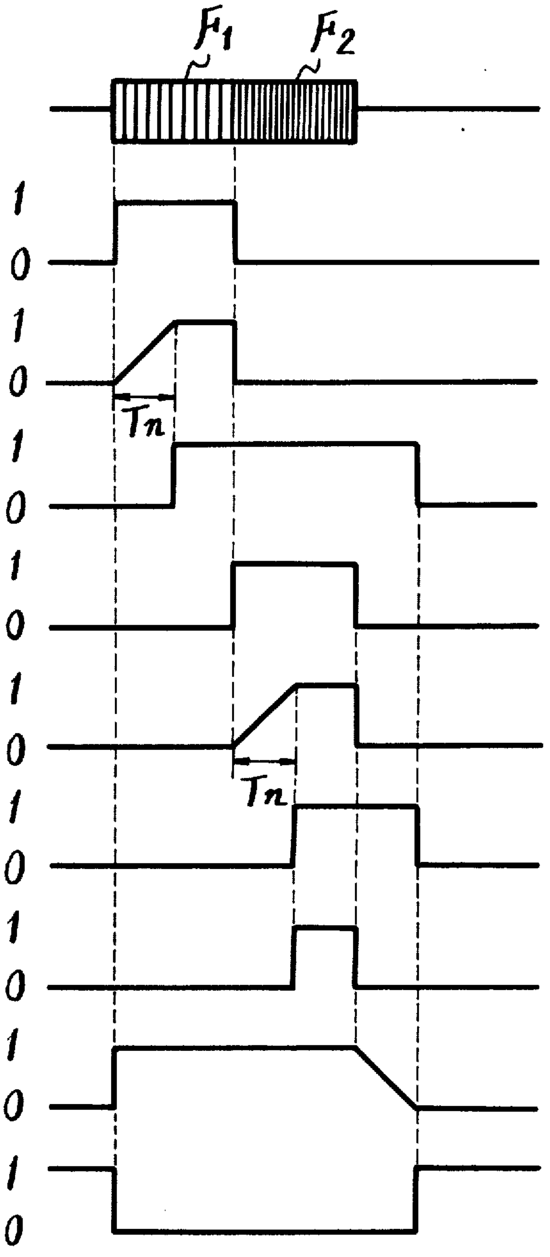
FIG. 7A to FIG. 7J show waveforms produced at various part of the remote control receiver shown in FIG. 6.

Firstly, the case that the supersonic signal $F_1$ with the frequency $f_1$ and then the supersonic signal $F_2$ with the frequency $f_2$ shown in FIG. 7A are received will be described. When the supersonic signal $F_1$ is received, the band pass filter 33*a* tuned to the frequency $f_1$, permits the detecting circuit 34*a* to an output signal of "1" level shown in FIG. 7B. The discharging time constant of the detecting circuit 34*a* is selected to be short, so that the transistors 42 and 43 of the noise eliminating circuit 45*a* immediately perform their on-off operations in accordance with the existence of the remote control signal. Accordingly, when the supersonic signal $F_1$ is received, the transistor 43 is made non-conductive immediately, but the potential at the collector electrode of the transistor 43 rises gradually as shown in FIG. 7C due to the resistor 44R and capacitor 44C and, after the lapse of the time $T_n$ reaches the level capable of making the transistor 47*a* of the flip--flop circuit 35*a* conductive. When this happens, the transistor 52 of the reset circuit 48 is made conductive by the remote control signal and its collector potential drops to the 0 level, as shown in FIG. 7J, so that the flip-flop circuit 35*a* is made operable. Accordingly, the transistor 47*a* becomes conductive and hence the collector potential of the transistor 47*b* is held at the 1 level, as shown in FIG. 7D. Since no signal is fed to the flip-flop circuit 35*b* in this state, its output signal remains at the 0 level and hence the output at the output terminal 37b also remains at the 0 level.

Thereafter, when the supersonic signal $F_2$ is received, the band pass filter 33*b* tuned to the frequency $f_2$ passes the signal to permit the output of the detecting circuit 34*b* to change to the 1 level as shown in FIG. 7E. As in the case of receiving the supersonic signal $F_1$, the output of the noise eliminating circuit 45*b* increases gradually as shown in FIG. 7F after the supersonic signal $F_2$ is received. After the predetermined time period T*n* has lapsed, the output of the flip-flop circuit 35*b* changes to the 1 level as shown in FIG. 7G. Accordingly, during a time interval within which the output of the flip-flop circuit 35*a* is 1 and the output of the noise eliminating circuit 45*b* is also 1, there is obtained at the control signal output terminal 37*a* an output signal of the 1 level shown in FIG. 7H. At this time, since the transistor 43 of the noise eliminating circuit 45*a* is in on the conductive state, its collector potential becomes 0 and the output at the control signal output terminal 37*b* becomes 0 irrespective of the state of the flip-flop circuit 35*b*.

When the reception of the supersonic signals is stopped, the base potential of the transistor 52 of the reset circuit 48 decreases gradually in accordance with the discharging time constant determined by the resistor 50 annd the capacitor 51, as shown in FIG. 7I, and after a predetermined time period has lapsed the transistor 52 becomes non-conductive. Thus, the collector potential of the transistor 52 becomes 1 as shown in FIG. 7J and hence the flip-flop circuits 35*a* and 35*b* are reset. That is, when the supersonic signal $F_1$ is received and then the supersonic signal $F_2$ is received, an output 1 signal is obtained at the control signal output terminal 37*a* only. On the other hand, when the supersonic signal $F_2$ is received first and then the supersonic signal $F_1$ is received, an output 1 signal is obtained at the control signal output terminal 37*b* only. The operation of the circuit in this case is substantially same as that described above, so that its description is omitted for the sake of simplicity.

Since the transistor 52 of the reset circuit 48 is kept non-conductive when no signal is fed to the reset circuit, the outputs of the flip-flop circuits 35*a* and 35*b* are both kept at 0 and hence the outputs at the control signal output terminals 37*a* and 37*b* are also kept at 0.

In the embodiment shown in FIG. 6, it is defined that the control signal is generated when the output at the control signal output terminal 37*a* or 37*b* becomes 1.

With the embodiment of FIG. 6, the misoperation which may be caused by noises can be avoided by the provision of the noise eliminating circuits 45*a* and 45*b* as in the case of the embodiment shown in FIG. 3.

Further, in the embodiment of FIG. 6, the time constant of the reset circuit 48 is selected to be longer than that of the detecting circuits 34*a* and 34*b*, so that even if a remote control signal received by the intervention of a reflected supersonic signal on the ambient, which is a normal remote control signal, is temporally interrupted, the flip-flop circuits are prevented from being erroneously reset.

It will be apparent that many modifications and variations could be effected by those skilled in the art without departing from the spirit and scope of the novel concepts of the present invention.

We claim as our invention:

1. A remote control system for remotely controlling an apparatus in response to a remote control signal having a plurality of different frequency components arranged in a predetermined selection of orders, said system comprising:

a. means for receiving the remote control signal transmitted thereto;

b. frequency selecting means for selecting the different frequency components of said received remote control signal with different frequencies and producing a plurality of selected output signals corresponding to said different frequency components, respectively;

c. means for memorizing one of said selected output signals;

d. first gating means for gating an output of said memorizing means in response to a subsequent one of said selected output signals; and e. second gating means comprising first and second control signal output terminals and being connected to said first gating means to be enabled by the output of said first gating means during the occurrance of said subsequent one of said output signals and being gated in response to said subsequent one of said selected output signals to supply an output signal through said first output terminal when a first one of said frequency components occurs first and through said second output terminal when a second one of said frequency components occurs first.

2. A remote control system for remotely controlling an apparatus recited in claim 1, wherein said remote control receiver means further comprises means for resetting said memorizing means in response to a disappearance of said remote control signal.

3. A remote control system for remotely controlling an apparatus in response to a remote control signal having two different frequency components arranged in a predetermined order, said system comprising:

a. means for receiving the remote control signal transmitted thereto;

b. frequency selecting means for selecting the different frequency components of said received remote control signal with the different frequencies and producing two selected output signals corresponding to said different frequency components, respectively;

c. first means for memorizing one of said selected output signals;

d. second means for memorizing the other of said selected output signals;

e. first gating means connected to said first memorizing means and to the frequency selecting means for selecting the other of said selected output signals for gating an output signal of said first memorizing means in response to an output signal from said first memorizing means and to a signal corresponding to the other of said selected output signals; and f. second gating means connected to said second memorizing means and to the frequency selecting means for selecting the first of said selected output signals for gating an output signal of said second memorizing means in response to an output signal from said second memorizing means and to a signal corresponding to the one of said selected output signals.

4. A remote control system for remotely controlling an apparatus recited in claim 3, wherein said frequency selecting means includes two band pass filters each having a different resonant frequency and two detecting circuits connected to said band pass filters, respectively, each of said detecting circuits comprising a time constant circuit.

5. A remote control system for remotely controlling an apparatus recited in claim 4, wherein said remote control receiver means further comprises first and second noise eliminating means connected, respectively, between said first detecting circuit and said first memorizing means and between said second detecting circuit and said second memorizing means for actuating the respective memorizing means only when the respective remote control signal remains within a predetermined period.

6. A remote control system for remotely controlling an apparatus recited in claim 5, wherein said noise eliminating means comprises a time constant circuit selected to be longer than the time constant of either of said detecting circuits.

7. A remote control system for remotely controlling an apparatus recited in claim 4, wherein said remote control receiver means further comprises means for resetting said first memorizing means and second memorizing means simultaneously in response to disappearance of said remote control signal.

8. A remote control system for remotely controlling an apparatus recited in claim 7, wherein said resetting means comprises a time constant circuit selected to be longer than the time constant of either of said detecting circuits.

* * * * *